June 4, 1935.  A. D. OLDS  2,003,490

BEVERAGE MAKER

Filed Oct. 20, 1934

INVENTOR.
AMBROSE D. OLDS.

BY B. F. Funk

ATTORNEY.

Patented June 4, 1935

2,003,490

UNITED STATES PATENT OFFICE 2,003,490

BEVERAGE MAKER

Ambrose D. Olds, Wichita, Kans.

Application October 20, 1934, Serial No. 749,240

9 Claims. (Cl. 219—43)

This invention relates to beverage makers and particularly to that class in which a heating element is provided for heating liquid in the container. In such devices where the heating element is electrical difficulty is encountered in preventing moisture from contacting the heating element when the beverage maker is being washed. If the base of the beverage maker is placed in the dish pan the water frequently seeps past the sealed end and causes rust and other elements to deteriorate the heating element. I have provided means whereby the receptacle can be expeditiously and conveniently detached from the base so that it can be washed and replaced after each beverage making operation.

In order to understand my invention reference should be had to the following description in connection with the following drawing, in which.

Figure 1:
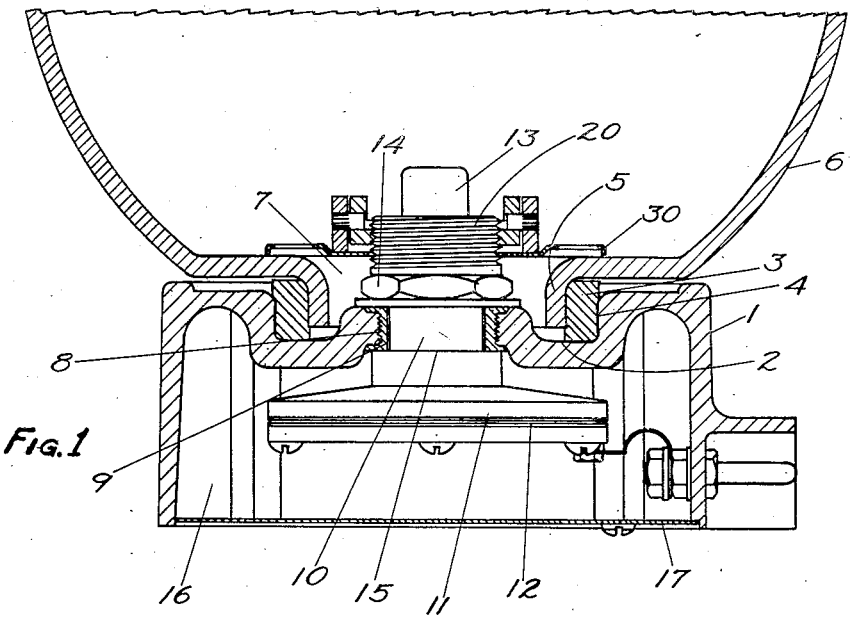
Figure 1 is a sectional view through the base and part of the receptacle of a beverage maker, showing my invention applied.
Figure 2:
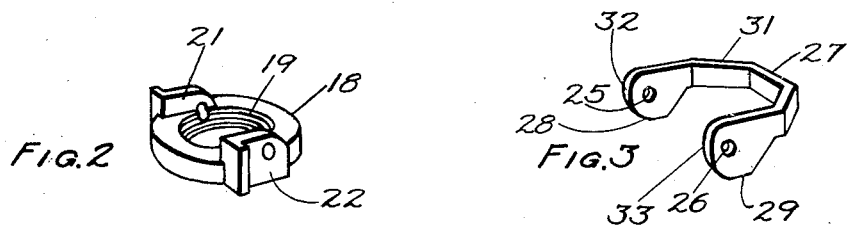
Figure 2 is a perspective view of the cam supporting element constituting part of the clamp.
Figure 3:
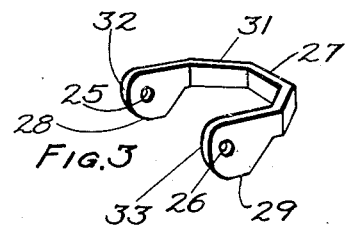
Figure 3 is a perspective view of the cam.
Figure 4:
Figure 4 shows one of the pins for pivoting the cam to the ring.
Figure 5:
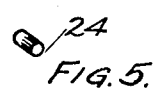
Figure 5 shows the other pin for pivoting the cam to the ring.

Referring now to the drawing by numerals of reference: 1 designates a base having a recessed portion 2 in its top to provide a seat for a compressed gasket 3 which is adapted to lie against vertical wall 4 of recess and which is adapted to be overlapped by the depending flange 5 in the bottom of the receptacle 6. The flange 5 surrounds an opening 7 and it together with vertical wall 4 confines the gasket 3 in a sealing space so that when the receptacle 6 is forced down on the base the gasket will be expanded laterally to form a seal. In the top of the base is a threaded opening 8 which carries a collar 9 through which the nose or upstanding projection 10 of the heating element 11 projects. The heating element per se is indicated at 12 and the upstanding projection 10 constitutes a well terminating in a nose 13 to receive the percolator pump, not shown.

A cylindrical nut 14 is screwed on the projection 10 to bring the shoulder 15 against the ring or collar 9. The bottom of the nut together with the shoulder 15 constitute a seal to prevent liquid from passing down into the open space 16 of the base, the bottom of the base being sealed by plate 17. A clamping ring 18 having internal threads 19 is threaded on threaded portion 20 of the projection 10 and carries two ears 21 and 22 in which are the pins 23 and 24 received in openings 25 and 26 of the cam 27. The cam is substantially U shaped and the high lobes 28 and 29 are adapted to bear upon perforate clamping plate 30 overlapping the bottom of receptacle 6.

When the parts are assembled as shown in Figure 1 the seal between the receptacle 6 and the base is effected. If it is decided to remove the receptacle, that is detach it from the base, the operator swings the bail like portion 31 of the cam 27 upwardly so that the low lobes 32 and 33 of the cam are now above the plate 30 so that the ring 18 may be easily unscrewed from the threaded portion 20. Then the receptacle and plate 30 can be raised off the base and after the receptacle 6 is washed it can be replaced on base, the ring 18 being screwed on the threaded portion 20 and the bail portion 31 of the cam can be swung down so that the high lobes 28 and 29 now bear upon the plate 30 so that the receptacle is removably held in fixed position with respect to the base and the cams 28 and 29 are so designed that the yielding gasket 3 will expand laterally to fill the space which it occupies and thereby forms an effective seal.

This invention particularly lends itself to those devices in which a metal base is used and a porcelain or glass receptacle is employed as it permits the receptacle to be removed and washed with less danger of breakage than is possible where the base is fixed to the receptacle and a very important feature is that the base is not subjected to danger of deterioration by water seeping into the heater space. Therefore the effective life of the device is materially enhanced. I am aware that other means may be employed for removably fastening the receptacle to the base so I do not wish to be limited to exact details of construction shown. The essential feature of this invention in its generic sense is the removable receptacle attached to the base for the purpose above described.

What I claim is:

1. In combination a heater base, a receptacle for the base having a central opening in its bottom, a packing ring between the receptacle and the base, an upstanding projection on the base extending through the opening in the bottom of the receptacle, a detachable ring on the upstanding projection, a cam carried thereby and a clamping disc against which the cam operates to force the receptacle down upon the packing.

2. A base having an upstanding projection, a packing gasket surrounding the projection, a receptacle resting on the gasket and having an opening surrounding the projection, a ring detachably engaging the projection, a perforate plate bearing on the bottom of the receptacle and means carried by ring cooperating with plate to force the receptacle against the gasket.

3. In a percolator a base having a heating element provided with upstanding projection, a receptacle above the base having an opening surrounding the upstanding projection, a yielding packing gasket between the receptacle and the base, a ring threaded on the upstanding projection, a substantially U shaped cam member pivotally carried between the ring and a plate between the cam member and the bottom of the receptacle whereby the cam member can exert pressure against the plate to force the receptacle against the gasket.

4. A base having threaded part, a packing gasket surrounding the threaded part, a receptacle resting on the gasket having an opening concentric with the threaded part, a concentric member detachably engaging the threaded part, a member between the concentric member and the bottom of the receptacle and means carried by the concentric member cooperating with the last named member to force the receptacle against the gasket.

5. A heater base, a receptacle for the base having a central opening in its bottom, a packing ring between the receptacle and the base, the base having a threaded portion concentric with the opening in the bottom of the receptacle, a nut for engagement with the threaded portion on the base, a yielding member between a part of the nut and the bottom of the receptacle and means carried by the nut cooperating with the yielding member to force the receptacle against the gasket.

6. In a device of the class described a base, a yielding ring shaped gasket on the base, a receptacle having a different coefficient of expansion than the base and provided with an opening in its bottom, a flange surrounding the opening projecting into and lying against the inner wall of the gasket, means for clamping the gasket to form a seal, said means comprising a threaded portion on the base, a nut engaging the threaded portion, a yielding member in the receptacle bearing against the bottom of the receptacle and a member carried by the nut to engage the yielding member.

7. A liquid receptacle having an opening in its bottom surrounded by a conical flange, a base having a recessed seat provided with a vertical wall, a yielding ring shaped gasket on the seat between the wall of the seat and the flange, a yielding clamping means to compress the gasket between the receptacle and the base to expand the gasket laterally to provide a seal, said yielding clamping means including a member bearing on the bottom of the receptacle, a nut engaging a part on the base and a locking member for the nut.

8. A liquid receptacle having an opening in its bottom surrounded by a flange, a base having a seat with a vertical wall spaced from the flange, a ring shaped gasket in the seat surrounding the flange, a member extending across the bottom of the receptacle and resting thereon, a nut engageable with a part on the base and bearing against the member to draw the receptacle down on the gasket to expand it laterally against the flange and the side wall and means on the nut for applying pressure to the yielding member.

9. In a device of the class described a base having a seat with a side wall, a yielding ring shaped gasket on the seat, a receptacle having a depending flange overlapping the gasket and a yielding means for clamping the base and the receptacle together to expand the gasket laterally, said yielding means comprising a member bearing on the bottom of the receptacle, a nut engaging the base and means on the nut for applying pressure to the first named member.

AMBROSE D. OLDS.